United States Patent Office 3,446,861
Patented May 27, 1969

3,446,861
CYCLODIMERIZATION PROCESS
Henry R. Menapace, Stown, Neil A. Maly, Tallmadge, Gereld S. Benner, Akron, and Donald V. Hillegass, Kent, Ohio, assignors to The Goodyear Tire & Rubber Company, Akron, Ohio, a corporation of Ohio
No Drawing. Filed June 20, 1968, Ser. No. 738,413
Int. Cl. C07c 3/60, 13/26, 11/16
U.S. Cl. 260—666    11 Claims

ABSTRACT OF THE DISCLOSURE

An improved process for the cyclodimerization of 1,3-butadiene hydrocarbons to form cyclic dimers of these 1,3-butadienes is disclosed. The catalyst system employed is a mixture of (1) an iron salt or complex, (2) a reducing agent which is an organometallic compound or a metal hydride wherein the metal is selected from Groups Ia, IIa, IIb and IIIa of the periodic system, and (3) a ligand of the formula

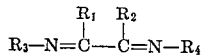

wherein $R_1$ and $R_2$ may be hydrogen, alkyl groups, or some other functional group such as halogen; and $R_3$ and $R_4$ are hydrocarbons containing double bond unsaturation in conjugation with the C=N unsaturation.

---

This invention relates to the cyclodimerization of 1,3-butadiene hydrocarbons. More specifically, it relates to an improved method for the production of high yields of cyclodimers of 1,3-butadiene hydrocarbons at satisfactory reaction rates and a high selectivity to the cyclic dimer.

It has become known that 1,3-butadiene hydrocarbons, substituted and unsubstituted, can be converted catalytically into dimers. These dimers are cyclic in nature and usually take two forms, one wherein all eight of the carbon atoms in the spine of the two moles of the 1,3-butadiene hydrocarbon are in a cyclic ring and the other form being where only a portion of the total number of carbon atoms in the spine of the 1,3-butadiene hydrocarbons is a cyclic ring. Taking the simplest form of a 1,3-butadiene hydrocarbon, 1,3-butadiene, the cyclic dimer containing all of the carbon atoms in the cyclic ring would be 1,5-cyclooctadiene and the form wherein only a portion of the carbon atoms are in the cyclic ring would be vinyl cyclohexene. It is desirable in many instances to convert 1,3-butadiene hydrocarbons into cyclic dimers wherein all of the carbon atoms found in the spine of the 1,3-butadiene hydrocarbon is encompassed in a cyclic ring. For instance, cyclodimers of 1,3-butadienes can be employed as precursors to form dibasic acids, diamines, diisocyanates and other difunctional chemical compounds by well known techniques.

These prior art processes which have been reported use, for instance, a catalyst system comprising a mixture of (1) an iron salt or complex, such as ferric acetylacetonate, (2) a reducing agent, such as triethylaluminum, and (3) a ligand, such as phenol acetylene or triphenyl phosphine or 2,2'-bipyridyl. The reactions are usually conducted in benzene as a solvent and mild temperatures ranging up to about 50° C. are used.

However, it has been observed that these prior art processes, while a substantial amount of the 1,3-butadiene hydrocarbon is converted into dimer, the selectivity to the desirable cyclodimer, that is, wherein all of the carbon atoms in the spine of the two moles of 1,3-butadiene is encompassed in the cyclic ring, is not too good. For instance, when 1,3-butadiene is dimerized by these prior art processes, the conversion is about 70% which is fair; but the selectivity to 1,5-cyclooctadiene is usually poor with maximum yields only up to about 33%.

It has been discovered that when certain changes in the operating conditions of these prior processes and a new class of ligands is employed, there is a considerable improvement in both the conversion of the 1,3-butadiene hydrocarbons to the dimer and a rather startling improvement in the selectivity to the completely cyclic form of the dimer and also it has been noted that an improvement is obtained in the reaction rate.

Accordingly, the invention of this application is a process for the conversion of 1,3-butadiene hydrocarbons into cyclic dimers which contain all of the carbon atoms in the spine of the two moles of the butadiene-1,3 hydrocarbon in a cyclic ring. Thus, the invention comprises contacting at least one 1,3-butadiene hydrocarbon, in a solvent system, with a ternary catalyst system comprising (1) at least one material selected from the group consisting of iron salts and iron complexes, (2) at least one reducing agent selected from the group consisting of organometallic compounds and metallic hydrides, the metal portions of which are selected from Groups Ia, IIa, IIb, and IIIa of the periodic system of elements, and (3) a ligand of the formula

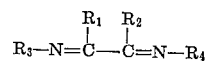

wherein $R_1$ and $R_2$ may be hydrogen, alkyl groups or some other functional group such as halogen; and $R_3$ and $R_4$ are hydrocarbons containing double bond unsaturation in conjugation with the C=N unsaturation.

Representative of the 1,3-butadiene hydrocarbons which are cyclodimerized in the practice of this invention are 1,3-butadiene, isoprene or 2-methyl-1,3-butadiene, 2-ethyl-1,3-butadiene, 2-propyl-1,3-butadiene, 2-butyl-1,3-butadiene, piperylene and the like.

The iron salts useful in the practice of this invention are preferably the iron salts of carboxylic acids containing from about 2 to about 40 carbon atoms. Representative but no means exhaustive of the iron salts of such carboxylic acids include ferric acetate, ferric proprionate, ferric isobutyrate, ferric-n-butyrate, ferric trimethyl acetate, ferric n-pentanoate, ferric 3-methyl butyrate, ferric octanoate and various other iron salts of other carboxylic acids containing from about 2 to about 40 carbon atoms.

The iron complexes useful in the invention are the ferric complexes of such agents as 1,3-diketones. Representative of such complexes are ferric 2,4-pentanedionate (commonly called ferric acetylacetonate), ferric-3-methyl-2,4 - pentanedionate, ferric-1-ethoxy-1,3-butanedionate, ferric - 1,3-diethoxy - 1,3 - propanedionate, ferric-1,3-diphenyl-1,3-propanedionate, ferric-1-cyclohexyl-1,3-butanedionate and other ferric complexes of 1,3-diketones.

Also useful in this invention as an iron salt are the ferric salts of alkyl substituted naphthenic carboxylic acids, and the ferric soaps or the soap called iron drier compounds. The ferric salts of individual naphthenic acids are rarely found because the napthenic acids are usually complex mixtures with their common derivatives being cyclopentane, cyclohexane, cycloheptane and the higher molecular weight alkyl substituted analogs.

The cyclic soaps useful in this invention are usually iron in combination with fatty acids such as stearic rosin (resinates) and tall oil (tallate).

Of all the compounds useful as the ferric salt or ferric complex in this invention, ferric octanoate and ferric acetylacetonate are preferred.

The second component of the catalyst system are reducing agents consisting of at least one member of the class of metal compounds selected from the group consisting of organometallic compounds and hydrides of elements of Groups Ia, IIa, IIb, and IIIa of the Periodic System of Elements. The preferred metallic elements from the above groups are lithium, sodium, potassium, magnesium, calcium, boron and aluminum. Representative but not all inclusive of suitable compounds of the above metallic elements are lithium hydride, calcium hydride, aluminum hydride, phenyl sodium, phenyl lithium, n-butyl lithium, tertiary butyl lithium, benzyl potassium, phenyl magnesium chloride, ethyl magnesium bromide, diethyl magnesium, triethyl aluminum, triisobutyl aluminum, dibutyl zinc, diethyl zinc and the like. Trialkylaluminums such as triethylaluminum and alkyllithiums such as n-butyl lithium are preferred organometallic compounds for use with this invention.

The third component of the ternary catalyst system of this invention consists of an organic ligand type molecule. The ligand is believed to direct the reaction toward the cyclodimer formation wherein the cyclodimer contains all of the carbon atoms in the 1,3-butadiene hydrocarbon spine. For instance, the ligand is believed to result in the high selectivity of 1,5-cyclooctadiene from 1,3-butadiene. The class of ligands which is employed in the present invention are those ligands responding to the formula

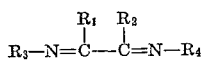

wherein $R_1$ and $R_2$ may be hydrogen alkyl groups or some other functional group such as halogen; and $R_3$ and $R_4$ are hydrocarbons containing double bond unsaturation in conjugation with the C=N unsaturation. These ligands may be described as imines. Representative examples of such ligands are: diacetyl-bis-(2,4,6-trimethylanil), biacetyl-bis-(2-trifluoromethylanil), biacetyl-bis-anil, biacetyl-bis-(4-hyroxyanil), biacetyl-bis-(2-methylthioanil), glyoxal-bis-(2-methoxyanil), biacetyl-bis-(2,5-dimethoxyanil), biacetyl-bis-(4-ethoxyanil), biacetyl-bis-(2-ethoxyanil), biacetyl-bis-(2-methylanil, biacetyl-bis-(3-methylanil), biacetyl-bis-(4-methylanil), glyoxal-bis-(4-methylanil), biacetyl-bis-(2,3-dimethylanil), biacetyl-bis-(2,4-dimethylanil), biacetyl-bis-(2,5-dimethylanil), biacetyl-bis-(2,6-dimethylanil), biacetyl-bis-(3,4-dimethylanil), biacetyl-bis-(3,5-dimethylanil), biacetyl-bis-(4-ethylanil), biacetyl - bis-(4-diethylaminoanil), biacetyl-bis-(2-isopropylanil), glyoxal-bis-(2-isopropylanil), and biacetyl-bis-(4-tert. butyl anil).

Of these ligands, those ligands which are preferred are the ligands, in which $R_3$ and $R_4$ in the above mentioned formula represent benzene type substituents, and of these the most preferred ligands are those which contain substitution at the 2 and/or 6 position of the benzene ring. The most preferred species is exemplified by reference to Examples V, VI, VII and VIII which follow.

The components of the catalyst system employed in this invention should be as pure as can be economically obtained and the catalyst components as well as the dimerization system should be essentially free of moisture and other deleterious substances. Particularly deleterious to the catalyst system of this invention are strong Lewis acid and Lewis base-type compounds.

The ligand to iron mole ratio of the above catalyst system can vary over considerable range. Although there is no definite lower range of ligand to use, sufficient ligand must be employed to assure a high selectivity of the desired cyclodimer. There is no theoretical upper limit to the ligand/$Fe^{+++}$ mole ratio but large excesses of ligand would represent an economic waste. It has been found experimentally that the ligand/$Fe^{+++}$ mole ratios between about 1/1 and 4/1 result in satisfactory cyclodimerization reactions, a ratio of between about 1.5/1 and 3/1 being more preferred.

The mole ratio of the reducing agent to the $Fe^{+++}$ may vary widely. However, no lower limit is specified but sufficient reducing agent must be employed to promote a practical cyclodimerization of the 1,3-butadiene hydrocarbon. It has been determined that when the reducing agent is an alkyllithium compound, the optimum ratio of reducing agent/$Fe^{+++}$ may vary between about 8/1 to about 10/1. When the reducing agent is an alkylaluminum compound, the optimum ratio of reducing agent/$Fe^{+++}$ has been found to vary between about 2/1 and about 6/1.

The total amount of catalyst used is usually based on the ratio of the 1,3-butadiene hydrocarbon to $Fe^{+++}$. Sufficient catalyst concentrations must be present to cause an efficient cyclodimerization reaction and excesses of catalyst will result in an economic waste. It has been found that the 1,3-butadiene hydrocarbon/$Fe^{+++}$ mole ratios can vary from 400/1 up to 10,000 or more/1 with satisfactory reaction rates.

The temperature at which the cyclodimerization process of this invention is conducted may vary from a low temperature of about 50° C. up to 130° C. However, it has been found that the best results have been obtained when the reaction is begun at a temperature of about 100 to 110° C. and then allowed to proceed at a lower temperature, for instance, 75–80° C.

The pressures which are employed in this process can range from ambient pressure created by the monomer/solvent system at operating temperature or extremely high pressures can be maintained by use of inert gas. It is practical to employ pressures from the ambient pressure up to about 400 p.s.i.g.

It is usually desirable, but not necessary, to conduct the cyclodimerization in the presence of an inert diluent or vent has no adverse effect on the reaction. Representative solvent. The term "inert" is meant to denote that the solof such solvents are benzene, toluene, xylene, hexane, heptane, pentane and the like. Mixtures may also be employed and it is usually preferred to employ benzene or toluene. Bulk dimerizations may also be employed utilizing the 1,3-butadiene hydrocarbon as the solvent with no additional solvent. If a solvent is used, the concentration of the 1,3-butadiene hydrocarbon to the solvent may vary from about 1/1 to about 15/1 based on volume. This concentration is not important.

In the practice of this invention it is usually desirable to employ air-free and moisture-free techniques.

The practice of this invention is further illustrated by reference to the following examples which are intended to be representative rather than restrictive of the scope of the invention. Unless otherwise noted, all parts and percentages are by weight.

EXAMPLES

In these examples, which were conducted in a 300 milliliter stainless-steel, stirred autoclave, the reactants were mixed in the following order: the particular 1,3-butadiene hydrocarbon was dissolved in the solvent; the particular iron salt or iron complex and the particular ligand was added. The mixture was brought up to the operating temperature at which time the reducing agent was added. The reaction time was counted from the addition of the reducing agent until the reaction was stopped by destroying the catalyst with the addition of an excess of isopropanol based on the total catalyst. The results were determined by vapor phase chromatography employing conventional techniques. In these examples the ligands are listed, the reaction conditions are set forth and the mole ratio of the reactants is reported in moles of each reactant and 1,3-butadiene hydrocarbon employed. The solvent 1,3-butadiene hydrocarbon volume ratio is given. The results obtained are reported in the percent conversion of the 1,3-butadiene hydrocarbon converted to dimer and the percent selectivity to each of the particular dimers formed.

EXAMPLE I

Reactants: Butadiene, ferric octanoate, triethylaluminum, diacetyl-bis-anil

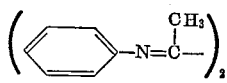

Conditions:
  Temperature—99 to 102° C.
  Pressure—100 to 382 p.s.i.g.
  Time—15 minutes
  Solvent—Benzene
  Solvent/1,3-butadiene ratio—about 6.8/1
Catalyst ratios: Fe/ligand/Al/Butadiene mole ratio= 0.0002/0.0004/0.0010/0.1
Results:
  75% Conversion
  65% Selectively to 1,5 cyclooctadiene
  19% Selectivity to 4-vinylcyclohexene

EXAMPLE II

Reactants: Butadiene, ferric octanoate, triisobutyl-aluminum, diacetyl-bis-anil
Conditions:
  Temperature—104 to 123° C.
  Pressure—110 to 369 p.s.i.g
  Time—45 minutes
  Solvent—Benzene
  Solvent/1,3-butadiene ratio—about 6.8/1
Catalyst ratios: Fe/ligand/Al/Butadiene mole ratio= 0.0002/0.0004/0.0010/0.1
Results:
  93% conversion
  80% selectivity to 1,5-cyclooctadiene
  21% selectivity to 4-vinylcyclohexane

EXAMPLE III

Reactants: Butadiene, ferric octanoate, biacetyl-bis-(4-methylanil), triethylaluminum

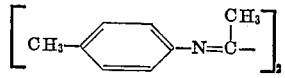

Conditions:
  Temperature—100–103° C.
  Pressure—110–394 p.s.i.g.
  Time—15 minutes
  Solvent—Benzene
  Solvent/1,3-Butadiene ratio—about 6.8/1
Catalyst ratios: Fe/ligand/Al/Butadiene mole ratio= 0.0002/0.0004/0.0010/0.1
Results:
  92% conversion
  72% selectivity to 1,5-cyclooctadiene
  18% selectivity to 4-vinylcyclohexane

EXAMPLE IV

Reactants: Butadiene, ferric octanoate, glyoxal-bis-(4-methylanil), triethylaluminum

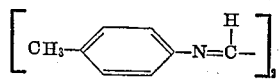

Conditions:
  Temperature—98–102° C.
  Pressure—155–403 p.s.i.g.
  Time—15 minutes
  Solvent—Benzene
  Solvent/1,3-butadiene ratio—about 6.8/1
Catalyst ratios: Fe/ligand/Al/Butadiene mole ratio= 0.0002/0.0004/0.0006/0.1
Results:
  78% conversion
  73% selectivity to 1,5-cyclooctadiene
  20% selectivity to 4-vinylcyclohexene

EXAMPLE V

Reactants: Butadiene, ferric octanoate, biacetyl-bis-(2-methylanil), triethylaluminum

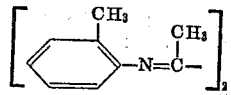

Conditions:
  Temperature—100–101° C.
  Pressure—150–411 p.s.i.g.
  Time—15 minutes
  Solvent—Benzene
  Solvent/1,3-butadiene ratio—about 6.8/1
Catalyst ratios: Fe/ligand/Al/Butadiene mole ratio= 0.0002/0.0004/0.0006/0.1
Results:
  63% conversion
  78% selectivity to 1,5-cyclooctadiene
  22% selectivity to 4-vinylhexene

EXAMPLE VI

Reactants: Butadiene, ferric octanoate, biacetyl-bis-(2-isopropylanil), triethylaluminum

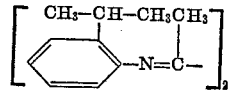

Conditions:
  Temperature—100–103° C.
  Pressure—160–385 p.s.i.g.
  Time—15 minutes
  Solvent—Benzene
  Solvent 1,3-butadiene ratio—about 6.8/1
Catalyst ratios: Fe/ligand/Al/Butadiene mole ratio= 0.0002/0.0004/0.0006/0.1
Results:
  70% conversion
  83% selectivity to 1,5-cyclooctadiene
  12% selectivity to 4-vinylcyclohexene

EXAMPLE VII

Reactants: Butadiene, ferric octanoate, biacetyl-bis-(2,6-dimethylanil), triethylaluminum

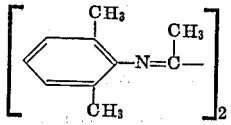

Conditions:
  Temperature—102–106° C.
  Pressure—190–412 p.s.i.g.
  Time—15 minutes
  Solvent—Benzene
  Solvent/1,3-butadiene ratio—about 6.8/1
Catalyst ratios: Fe/ligand/Al/Butadiene mole ratio= 0.0002/0.0004/0.0008/0.1
Results:
  57% conversion
  87% selectivity to 1,5-cyclooctadiene
  3% selectivity to 4-vinylcyclohexene

EXAMPLE VIII

Reactants: Butadiene, ferric octanoate, biacetyl-bis-(2,6-dimethylanil), triethylaluminum

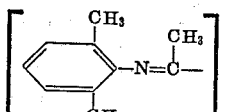

Conditions:
  Temperature—88–92° C.
  Pressure—140–438 p.s.i.g.
  Time—15 minutes Conditions:
 Solvent—Benzene
 Solvent/1,3-butadiene ratio—about 6.8/1
Catalyst ratios: Fe/ligand/Al/Butadiene mole ratio= 0.0003/0.0003/0.0009/0.1
Results:
 75% conversion
 95% selectivity to 1,5-cyclooctadiene
 2% selectivity to 4-vinylcyclohexene

EXAMPLE IX

Reactants: Butadiene, ferric octanoate, glyoxal-bis-(4-ethoxyanil), n-butyllithium

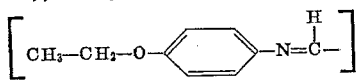

Conditions:
 Temperature—100° C.
 Pressure—150–395 p.s.i.g.
 Time—15 minutes
 Solvent—Benzene
 Solvent/1,3-butadiene ratio—about 6.8/1
Catalyst ratios: Fe/ligand/Li/butadiene mole ratio= 0.0002/0.0004/0.0016/0.1
Results:
 31% conversion
 53% selectivty to 1,5-cyclooctadiene
 11% selectivity to 4-vinylcyclohexene

EXAMPLE X

Reactants: Isoprene, ferric octanoate, diacetyl-bis-anil, triethylaluminum
Conditions:
 Temperature—90–100° C.
 Pressure—265–548 p.s.i.g.
 Time—30 minutes
 Solvent—Toluene
 Solvent/isoprene ratio—0.5/1
Catalyst ratios: Fe/ligand/Al/isoprene mole ratio= 0.00075/0.0015/0.00226/0.75
Results:
 71% conversion
 87% selectivity to 1,5-dimethyl - 1,5-cyclooctadiene and 2,5-dimethyl-1,5-cyclooctadiene
 12% selectivty to a cyclic diene containing 8 carbon atoms

EXAMPLE XI

Reactants: Butadiene, ferric octanoate, triethyl-aluminum, glyoxal-bis-(2,6-dimethylanil)

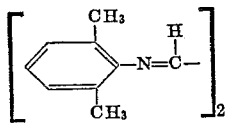

Conditions:
 Temperature—89.5–92° C.
 Pressure—230–525 p.s.i.g.
 Time—60 minutes
 Solvent—1,5-cyclooctadiene
 Solvent/1,3-butadiene ratio—0.2/1
Catalyst ratios: Fe/ligand/Al/butadiene mole ratio— 0.0002/0.0004/0.0006/0.82
Results:
 95% conversion
 3.1% selectivity to 4-vinylcyclohexene
 2.7% selectivity to cis-1,2-divinyl-cyclobutane
 90% selectivity to 1,5-cyclooctadiene
 3.9% selectivity to cyclododecatriene

EXAMPLE XII

Reactants: Butadiene, ferric octanoate, glyoxal-bis-(2,6-dimethylanil), triethylaluminum
Conditions:
 Temperature—89.5–93° C.
 Pressure—240–570 p.s.i.g.
 Time—50 minutes
 Solvent—Toluene
 Solvent/1,3-butadiene ratio—0.15/1
Catalyst ratios: Fe/ligand/Al/Butadiene mole ratio= 0.0002/0.0004/0.0006/1.36
Results:
 89% conversion
 93.2% selectivity to 1,5-cyclooctadiene
 2.4% selectivity to cis-1,2-divinyl-cylobutane

EXAMPLE XIII

Reactants: Butadiene, ferric octanoate, triethyl-aluminum, biacetyl-bis-naphthanil

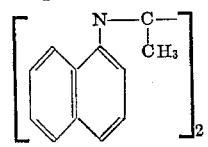

Conditions:
 Temperature—86.5–93° C.
 Pressure—240–500 p.s.i.g.
 Time—45 minutes
 Solvent—Toluene
 Solvent/1,3-butadiene ratio—0.48/1
Catalyst ratios: Fe/ligand/Al/Butadiene mole ratio= 0.0002/0.0004/0.0006/0.483
Results:
 81% conversion
 56% selectivity to 1,5-cyclooctadiene
 42% selectivity to 4-vinylcyclohexene While certain representative embodiments and details have been shown for the purpose of illustrating the invention, it will be apparent to those skilled in this art that various changes and modifications may be made therein without departing from the spirit or scope of the invention.

What we claim is:

1. The method of cyclodimerizing 1,3-butadiene hydrocarbons which comprises contacting at least one 1,3-butadiene hydrocarbon, in a solvent system, with a ternary catalyst system comprising (1) at least one material selected from the group consisting of iron salts and iron complexes, (2) at least one reducing agent selected from the group consisting of organometallic compounds and metallic hydrides, the metal portions of which are selected from Groups Ia, IIa, IIb and IIIa of the periodic system of elements, and (3) a ligand of the formula

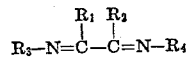

wherein $R_1$ and $R_2$ may be hydrogen, alkyl groups or some other functional group such as halogen, and $R_3$ and $R_4$ are hydrocarbons containing double bond unsaturation in conjugation with the C=N unsaturation.

2. The method according to claim 1 in which the butadiene hydrocarbon is butadiene-1,3.
3. The method according to claim 1 in which the butadiene hydrocarbon is isoprene.
4. The method according to claim 1 in which the ligand is biacetyl-bis-(2-methylanil).
5. The method according to claim 1 in which the ligand is biacetyl-bis-(2-isopropylanil).
6. The method according to claim 1 in which the ligand is biacetyl-bis-(2,6-dimethylanil).
7. The method according to claim 1 in which the iron salt is ferric octanoate.
8. The method according to claim 1 in which the iron complex is ferric acetylacetonate.
9. The method according to claim 1 in which the reducing agent is an aluminum trialkyl.
10. The method according to claim 1 in which the 1,3-butadiene hydrocarbon is 1,3-butadiene and in which the reducing agent is an aluminum trialkyl and in which the iron salt is ferric octanoate and in which the ligand is biacetyl-bis-(2,6-dimethylanil).

11. The method according to claim 1 in which the ligand is glyoxal-bis-(2,6-dimethylanil).

References Cited

UNITED STATES PATENTS

| | | | |
|---|---|---|---|
| 3,149,174 | 9/1964 | Mueller | 260—666 |
| 3,390,195 | 6/1968 | Chappel | 260—666 |

OTHER REFERENCES

M. Hida, et al.: Bull. Chem. Soc. Japan, vol. 39, pp. 1357–64, 1966.

DELBERT E. GANTZ, *Primary Examiner.*

V. O'KEEFE, *Assistant Examiner.*